Nov. 6, 1934.    R. F. NEWTON    1,979,809
LUGGAGE RACK AND TIRE CARRIER
Filed Oct. 20, 1931    2 Sheets-Sheet 1

Ray F. Newton INVENTOR
BY Virgil E. Woodcock
ATTORNEY

Nov. 6, 1934.   R. F. NEWTON   1,979,809
LUGGAGE RACK AND TIRE CARRIER
Filed Oct. 20, 1931   2 Sheets-Sheet 2

INVENTOR
BY
ATTORNEY

Patented Nov. 6, 1934

1,979,809

UNITED STATES PATENT OFFICE 1,979,809

LUGGAGE RACK AND TIRE CARRIER

Ray Frederick Newton, Corvallis, Oreg.

Application October 20, 1931, Serial No. 570,021

8 Claims. (Cl. 224—29)

In some cases it is the common practice to equip pneumatic tired vehicles with tire carriers for spare tires, and it is generally the practice to attach these carriers on the rear of the vehicle.

My invention relates to a combination luggage rack and tire carrier, and more particularly to the provision of suitable mounting means so that the luggage rack and tire carrier may be folded up into a compact unit when the luggage rack is not in use.

An object of my invention is the provision of a combined foldable luggage rack and tire carrier which is rigidly supported both in its folded and its extended positions.

Another object of my invention is the provision of a foldable luggage rack and tire carrier which in its folded position brings the plane of the tire and the rack into harmony with the body lines of the car.

Another object of my invention is the provision of a foldable luggage rack and tire carrier which may be secured in either the folded or extended position without diminishing the clearance from the road.

A further object of my invention is the provision of a foldable luggage rack and tire carrier which is arranged so that the weight of the luggage forces the luggage rack and tire carrier to the extended position.

Further objects and advantages will become apparent as the description proceeds and reference should now be had to the drawings which are attached hereto and form a part of this specification.

Figure 1 which shows a perspective view of the tire rack and luggage carrier in its folded position on the rear of an automobile.

Similar reference numerals refer to similar parts throughout the several views.

Figure 1:
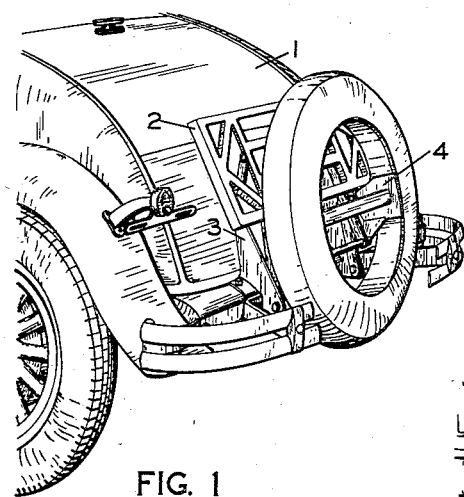
Figure 2:
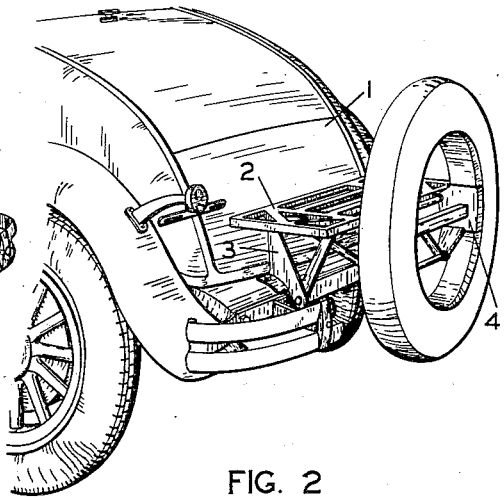
Figure 2 is a perspective view showing the tire rack and luggage carrier in its extended position.
Figure 3:
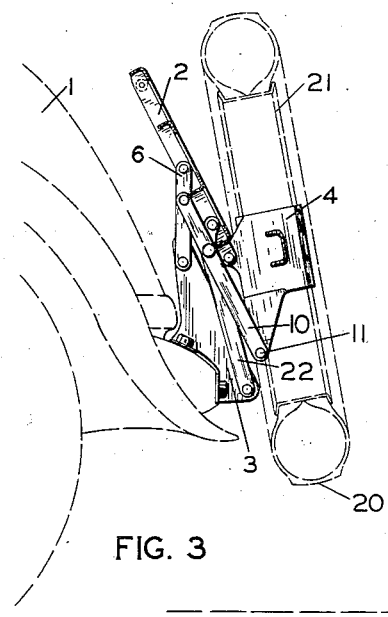
Figures 3 and 4 are partial sectional views corresponding to the positions illustrated in Figures 1 and 2 respectively.
Figure 4:
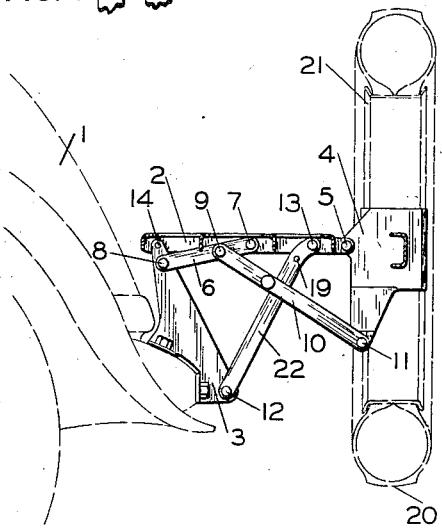

For convenience I have illustrated my invention in one form as applied to an automobile of the roadster type, although it is obvious that my invention is applicable to vehicles generally or to other applications where it may prove useful. Accordingly, the rear of the roadster is indicated at 1, upon which is mounted by brackets 3 my improved luggage rack and tire carrier. It will be noticed in Figure 1 that I have shown two brackets intermediate the ends of the luggage rack 2. For clarity of description I shall describe hereinafter the arrangement of one of the brackets as illustrated in the partial sectional views of Figures 3 and 4. Luggage rack 2 is pivotally connected to the tire carrier 4 as indicated at 5. It is also pivotally connected at its approximately mid portion 7 to link 6, the other end of link 6 being pivoted to the bracket 3 as at 8. On the link 6 there is pivotally connected at 9, a link 10, which extends to the lower portion of the tire carrier 4 and is there pivoted as indicated at 11. A third link 22 is pivotally connected to the bracket 3 as at 12 and to the outer end of the luggage rack as indicated at 13.

Figure 5:
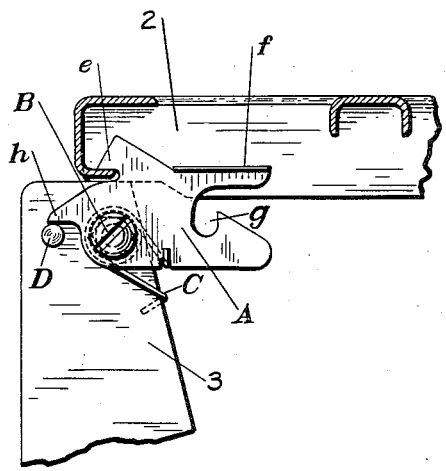
Figures 5 and 6 are diagrammatic views of the preferred form of locking device for fixing the luggage rack and tire carrier in the desired positions.
Figure 6:
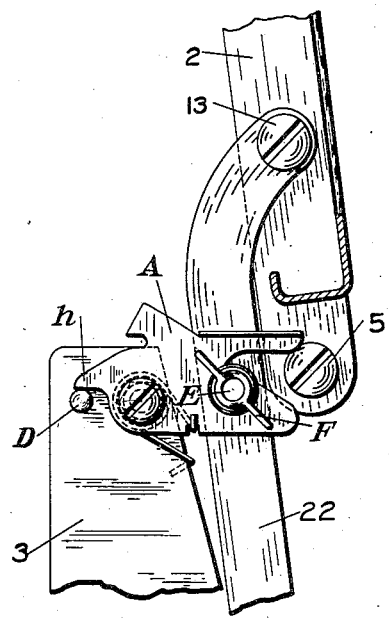

In order that the luggage carrier and tire rack may be firmly secured in either the folded or extended position, a holding device in the form of a latch system is provided. This latch system is illustrated in Figures 5 and 6. Figure 5 shows the upper part of the bracket 3 the latch A and a portion of luggage rack 2 as they are when the rack is in the extended position. Figure 6 shows the upper end of the bracket 3, the latch A, the upper end of the link 22, and the lower end of the rack 2 as they are when the carrier is in the folded position. The latch A which is pivotally hinged to the upper end of the bracket 3 by means of a screw or pin B, has on its periphery a hook $e$ and spaced from said hook on said periphery an L-shaped slot $g$ and a stop $h$. A spring C, which is hooked under the latch A, looped around the pin B, and over the edge of the bracket 3, presses the latch against a stop pin D thereby holding the latch in a horizontal plane except when it is deflected during the latching operation. When the carrier is moved to its extended position the rack 2 moves from the inclined position shown in Figure 3 to the horizontal position shown in Figure 4. Just before the rack 2 reaches its final horizontal position the projecting portion (shown in section on the left end of the rack 2 in Figure 5) strikes an inclined face of the hook $e$ of the latch A, thus causing the latch to move in a clockwise direction about the pivot pin B against the force exerted by the spring C. This movement of the latch continues until the rack rests on the bracket 3. At this point the projecting portion of the rack discontinues its engagement with the inclined face of the hook e allowing the spring C to turn the latch in a counter clockwise direction about its pivot point, whereby the hook e catches over the projection of the luggage rack and holds the carrier in the extended position. If it is desired to place the carrier in the folded position the rack may be released from the hook by applying a downward pressure to the thumb piece of the latch A as at f.

In the folding operation as the carrier reaches the folded position the body of a wing nut bolt E, which is fixed in the link 22, strikes against the inclined opening of the notch g in the latch A, thereby causing the latch to turn about its pivot pin in a clockwise direction. This movement continues until the body of the nut bolt E slides off the inclined face into the notch g allowing the latch, through the action of the spring C to turn in a counter clockwise direction about its pivot pin, thus securing the rack in its folded position. For further security, and to prevent rattling of the several parts, the wing nut F may then be tightened down against the latch. The carrier may be released from this position by loosening the wing nut and again pressing downward on the thumb piece of the latch as at f.

Figure 7:
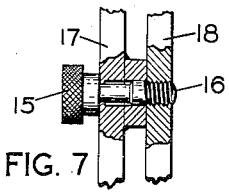
Figure 7 is a sectional view of a modified form of locking device.

A modified form of locking means is illustrated in Figure 7. This locking device is nothing more than a locking bolt 15, the end of which is screw threaded as at 16 and cooperates with threads provided in member 18. This member 18 corresponds to the link 22 and the member 17 corresponds to the link 10 when the luggage rack and tire carrier are in the folded position and to bracket 3 and the luggage carrier 2 respectively, when the rack is in the extended position.

When the modified form of locking means is used two lock bolts of the type shown in Figure 7 are provided, one on the rack 2 for locking the rack in the extended position and the other on the link 10 for locking the rack in the folded position. A screw threaded hole 14 is so placed in the bracket 3 that when the rack is in the extended position it will receive the bolt 15 carried by the rack 2. Another screw threaded hole 19 is so placed in the link 22 that it will receive the locking bolt 15 carried by the link 10 when the rack is in the folded position.

It will be noticed that the tire illustrated in outline at 20 and shown mounted on the rim 21 maintains its clearance from the roadway in both the extended and folded positions. This is a decided advantage, particularly when traveling on mountain roads where high road centers are likely to be encountered. It is further observed that in the folded position the tire and tire carrier are forwardly inclined, as is also the luggage rack. By suitably designing the length of the links the forward tilting may be predetermined so that the forward inclination is in harmony with the curve or slope of the rear of the car. This adds materially to the appearance of the car because the combination luggage and tire carrier follows in a material degree the rear lines of the automobile.

It is to be understood that while I have illustrated my tire carrier rigidly supporting a rim 21, upon which may be mounted a tire 20, a hub may be provided on the rack 4 instead of the rim for mounting wire wheels or the like.

While I have shown and described my invention in considerable detail I do not desire to be limited to the exact arrangement shown, but seek to cover in the appended claims all equivalent modifications that fall within the scope of my invention.

I claim:

1. In a foldable luggage rack and tire carrier, the combination of a rack, a tire carrier, pivot means for connecting directly said carrier to said rack, means for supporting said rack and tire carrier, a link pivotally connected midway across said rack and to said supporting means and means connecting said link and said tire carrier to hold said tire carrier substantially in a vertical plane when said rack and said carrier are in their extended positions, and to swing said rack upwardly about said pivot means on said tire carrier and to move said tire carrier to an acute angle with the vertical when said luggage rack and tire carrier are in their folded positions.

2. A foldable luggage rack and tire carrier for vehicles, supporting means therefor, means pivoting the luggage rack to the tire carrier, a link pivoted at one end substantially midway across the rack and at its other end to said supporting means, crossing links, one being pivoted to said first-mentioned link and to the tire carrier, the other being pivoted to the supporting means and to the end of the rack near the tire carrier whereby in the folded position the luggage rack extends upwardly from said pivoting means on the tire carrier.

3. In a foldable luggage rack and tire carrier, the combination of a rack and a tire carrier pivotally connected together, supporting means therefor, a link pivotally connected to said rack midway across the same and to said supporting means, crossing links, one of said links being pivoted to said first-mentioned link and to said tire carrier below said rack, the other crossing link being pivoted to said rack and pivoted to said supporting means at a point substantially lower than where said first-mentioned link is pivoted, whereby said rack and carrier may be folded or extended, the said tire carrier moving substantially horizontally.

4. A luggage rack and tire carrier operable from a folded to an extended position, supporting means therefore, pivot means for pivoting one end of said rack to said carrier, the opposite and free end of said rack being operable into abutting engagement with said supporting means when in said extended position, and a link having one end pivoted to said rack at substantially the mid portion of said rack and having its other end pivoted to said supporting means, and a link having one end pivoted to said first mentioned link and its other end pivoted to said carrier in spaced relation with said pivot means whereby said rack is rotated upwardly about said pivot means when said rack and carrier are moved from said extended position to said folded position.

5. A luggage rack and tire carrier operable from a folded to an extended position, supporting means therefore, pivot means for pivoting one end of said rack to said carrier, the free end of said rack being operable into abutting engagement with said supporting means when in the extended position, a link having one end pivoted to said rack at the mid portion of said rack and its other end pivoted to said supporting means for rotating said rack upwardly about said pivot means and rigid means interconnecting said link, said rack, said carrier, and said supporting means for supporting said rack and carrier in both said folded and extended positions.

6. An extensible and foldable luggage rack and tire carrier for automobiles, supporting means secured to the automobile, pivot means pivoting one end of the luggage rack directly to said tire carrier, the opposite end of said rack engaging said supporting means when said rack and tire carrier are in the extended position, a link having one end pivoted to said rack substantially midway across said rack and having its other end pivoted to said supporting means, crossing links, one being pivoted to said first mentioned link and to said tire carrier, the other being pivoted to said supporting means and to the end of said rack adjacent to said tire carrier whereby in the folded position said rack extends upwardly from said pivot means, and in said extended position said one end of said rack engages said supporting means.

7. A luggage rack and tire carrier operable from a folded to an extended position comprising supporting means for said rack and carrier, pivot means for pivoting one end of said rack to said carrier, said supporting means forming a stop for the free end of said rack, a link, a pivot pin connecting one end of said link to said rack midway across said rack, a pivot pin for connecting the other end of said link to said supporting means, crossing links one of which is pivoted to said first mentioned link and to said carrier at a point below said rack and the other of which is pivoted to said rack and to said supporting means at a point substantially lower than said first mentioned link so that in the extended position said rack and carrier are rigidly supported from said supporting means by said first mentioned link, said crossing links, and said free end of said rack, said links being proportioned to swing said tire carrier to an acute angle with the vertical when said rack and carrier are in their folded position.

8. A luggage rack and tire carrier operable from an extended to a folded position comprising supporting means for said rack and carrier, pivot means for pivoting one side of said rack to said carrier, the free side of said rack being operable into abutting engagement with said supporting means when in said extended position, a link pivotally connecting the mid portion of said rack to said supporting means whereby said rack can be rotated from a substantially horizontal position upwardly about said pivot means to a substantially vertical position, crossing links one of which is pivoted to said first mentioned link and to said carrier at a point below said rack and the other of which is pivoted to said rack and pivoted to said supporting means at a point substantially lower than said first mentioned link so that in said extended position said rack and carrier are supported from said supporting means by said first mentioned link, said crossing links, and said free side of said rack, locking means for locking said free side of said rack to said supporting means when in extended position, and locking means for locking said crossing links together when said rack and carrier occupy said folded position.

RAY F. NEWTON.